(12) United States Patent
Miller et al.

(10) Patent No.: US 12,039,104 B2
(45) Date of Patent: Jul. 16, 2024

(54) INPUT DEVICE WITH IMPROVED SPRING MEMBERS FOR MOVABLY MOUNTING THE OPERATING PART, ASSOCIATED SPRING MEMBER AND ASSEMBLY METHOD

(71) Applicant: Preh GmbH, Bad Neustadt a.d. Saale (DE)

(72) Inventors: Michael Miller, Bad Neustadt a.d. Saale (DE); Thilo Schultheis, Bad Neustadt a.d. Saale (DE); Tobias Bodenstein, Salz (DE); Michael Schwab, Sandberg (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 0 days.

(21) Appl. No.: 18/342,936

(22) Filed: Jun. 28, 2023

(65) Prior Publication Data
US 2024/0004473 A1   Jan. 4, 2024

(30) Foreign Application Priority Data
Jun. 29, 2022   (DE) .......................... 102022116244.3

(51) Int. Cl.
*G06F 3/01*   (2006.01)
*G06F 3/0354*   (2013.01)
(52) U.S. Cl.
CPC .......... *G06F 3/016* (2013.01); *G06F 3/03547* (2013.01)
(58) Field of Classification Search
CPC .............................. G06F 3/016; G06F 3/03547
See application file for complete search history.

(56) References Cited

U.S. PATENT DOCUMENTS 4,684,203 A     8/1987  Bihler
2017/0285848 A1* 10/2017 Rosenberg .......... G06F 3/04883
(Continued)

FOREIGN PATENT DOCUMENTS

DE   102016103768 A1   4/2017
DE   102017104979 A1   9/2018
(Continued)

OTHER PUBLICATIONS

European Search Report for application No. EP 23170611.0, dated Oct. 31, 2023. European Patent Office, Munich, Germany.
(Continued)

*Primary Examiner* — Hong Zhou
(74) *Attorney, Agent, or Firm* — M&B IP Analysts, LLC

(57) ABSTRACT

The present disclosure relates to an input device including an operating part with an input surface; a carrier; a mount that is adapted to mount the operating part on the carrier in a restoring manner, which are configured to mount the operating part to deflect from a rest position in a deflection direction substantially parallel to the input surface and to elastically restore to the rest position; and an actuator for an excitation of movement of the operating part in the deflection direction to generate a haptic feedback for an operator; wherein the mount comprises two spring members, which extend substantially parallel to one another and substantially parallel to the input surface, and which respectively have one leaf spring strip having a spring steel and three fastening members in which the leaf spring strip is positively accommodated, wherein the fastening members are arranged in a uniformly spaced-apart manner.

17 Claims, 5 Drawing Sheets

(56) References Cited

U.S. PATENT DOCUMENTS

2018/0260027 A1* 9/2018 Schmidt .............. B60R 11/0264
2018/0356928 A1* 12/2018 Ao ........................ G06F 1/1626
2019/0187796 A1* 6/2019 Schreurs ................ G06F 3/016
2020/0083790 A1 3/2020 Fust

FOREIGN PATENT DOCUMENTS

| | | |
|---|---|---|
| EP | 3499343 A2 | 6/2019 |
| JP | 6591617 B2 | 10/2019 |
| WO | 2014096565 A1 | 6/2014 |

OTHER PUBLICATIONS

Office Action for German patent application No. 10 2022 116 244.3, dated Feb. 20, 2023. German Patent and Trade Mark Office, Munich, Germany.

* cited by examiner

INPUT DEVICE WITH IMPROVED SPRING MEMBERS FOR MOVABLY MOUNTING THE OPERATING PART, ASSOCIATED SPRING MEMBER AND ASSEMBLY METHOD

The present disclosure relates to an input device with an operating part, which has a touch-sensitive input surface, for instance, wherein the operating part is mounted in a movable manner relative to a carrier and so that it elastically restores itself into a rest position in order to be capable of being made to oscillate or at least to move by means of an actuator. The oscillation or movement can be felt by the operator in the case of contact and thus serves for generating a haptic feedback during an input. Such an approach is known from the prior art. Different oscillation directions are proposed for this oscillation in the prior art, e.g. in US 2008055277 A1. Different concepts are also known as regards the actuator, preferably the electrically actuated actuator, e.g. those with an electromagnetic, piezo-electric, capacitive or electrostatic drive for the excitation of movement or oscillation. The present disclosure deals with the problem of the "floating" and restoring mounting of the operating part. Here, the crucial issue is a mounting that is as low-friction, low-wear and resistant to vandalism as possible, so that the rest position of the operating part is reliably maintained. Particularly in the case of motor vehicles, an important point is also to save space and weight. Moreover, reaching a predetermined and strain-free installation position is decisive for the haptic feedback to occur as defined and in a reproducible manner. High requirements with regard to the mounting result if the direction of the excitation of movement or oscillation caused by the actuator does not coincide with the direction of the actuation force exerted during a touch, in particular, if the two directions are orthogonal to each other. Even the smallest deformations of the spring members determining the oscillating mounting and the restoring action significantly disrupt the haptic feedback and prevent the haptic feedback from setting in as intended. Such deformations may be caused, for instance, by incorrect handling during the assembly process.

Thus, there is a demand for a mounting of the operating part in which a restoring shift of position in the direction parallel to the touch-sensitive input surface of the operating part is produced and maintained reliably and, above all, reproducibly, after assembly, in order to be able to dispense with laborious adjustments. Moreover, the restoring effect has to be permanent and, at the same time, constant in order not to require the readjustment of the excitation of oscillation by the actuator.

Against this background, it is the object of the present disclosure that an input device be provided which is improved with regard to its mounting, and in which the assembly and adjusting effort, in particular, is minimized. This object is achieved by an input device of claim 1. A correspondingly advantageous spring member and an associated assembly method are each the subject matter of the independent claims. Advantageous embodiments are the subject matter of the respectively dependent claims. It is to be noted that the features cited individually in the patent claims can be combined in any technologically meaningful manner and present other embodiments. The description, in particular in connection with the figures, additionally characterizes and specifies the disclosed embodiments.

The present disclosure relates to an input device. The input device according to the disclosed embodiments include an operating part, particularly a touchpad or touchscreen. The operating part has an input surface, in particular a touch-sensitive input surface. In the sense of the present disclosure, the term "touchpad" is to be interpreted broadly and relates to any touch-sensitive input device in which a touch on an input surface is detected in a spatially resolving manner, but independent of the level of spatial resolution. Preferably, a touchpad is provided in order to cause an input, e.g. the control of a cursor on a display, in accordance with the trajectory of a touch.

According to the disclosed embodiments, the touchpad may be part of a combination of a display and a touch-sensitive input surface ("touchscreen"), or define a display-less, i.e. purely touch-sensitive, input surface. The touch coordinates or their trajectories are determined capacitively, resistively or optically, for example.

The input device according to present disclosure further comprises a carrier on which the operating part or touchpad is movably mounted. The input device according to the present disclosure further includes means for mounting the operating part on the carrier in a restoring manner, which are configured for mounting the operating part so that it can be deflected from a rest position in a deflection direction substantially parallel to the input surface and so as to elastically restore it to the rest position. In other words, a movement of the operating part from, or preferably about, the rest position is made possible.

According to the present disclosure, an actuator for the excitation of movement of the operating part in the deflection direction, and thus for generating a haptic feedback in said deflection direction, is also provided. Preferably, this is an electrically actuated actuator, e.g. one with an electromagnetic, piezo-electric, capacitive or electrostatic drive for the excitation of movement or oscillation. For example, an electromagnetic actuator is provided, which has an armature and an electric coil electromagnetically cooperating with the armature. Preferably, the actuator is fastened exclusively to the actuating part.

According to one embodiment, a force sensor, e.g. a piezo-electric, capacitive, inductive force sensor, preferably an optical force sensor, is provided for detecting an actuating force acting on the input surface. For example, a haptic feedback generated by the actuator is triggered upon a predetermined actuating force being exceeded. For example, the force sensor is arranged between the carrier and the operating part or between the carrier and a housing on which the carrier is mounted in an elastically yielding or movable manner.

According to the present disclosure, the means for mounting the operating part in a restoring manner comprise two spring members, which extend substantially parallel to one another and substantially parallel to the input surface and respectively have at least one leaf spring strip consisting of spring steel and at least three fastening members distributed along the associated leaf spring strip, in which the leaf spring strip is positively accommodated. In this case, the two outer fastening members are arranged so as to be equally spaced from the one most closely adjacent inner fastening member, so that leaf spring strip portions of substantially the same length, which are capable of oscillating in a plane substantially parallel to the input surface, remain between the outer fastening members and the most closely adjacent, inner fastening members of the same spring member. Preferably, the leaf spring strip is arranged on edge between the operating part and the carrier, i.e. the main surface of the leaf spring strips is arranged substantially orthogonally to the input surface.

According to the present disclosure, the outer fastening members of a first spring member of the two spring members and an inner fastening member of a remaining second spring member of the two spring members form the operating-part-side fastening members, which is to express that they are each fixed to the operating part. According to the present disclosure, the outer fastening members of the second spring member and an inner fastening member of the first spring member form the carrier-side fastening members, and are thus each fixed on the carrier. The fastening members are fixed on the operating part or the carrier non-positively, by substance-to-substance connection or positively, for instance.

Preferably, all fastening members are formed from a thermoplastic material, more preferably, at least one of the fastening members is at least partially formed from a thermoplastic elastomer. The latter causes the structure of the operating part, which is otherwise rigid in the actuation direction, to yield in a defined manner under the action of an operating force, thus enabling a measurement of the actuation force by the above-described force sensor.

For example, the leaf spring strips are manufactured in a punching step and preferably configured identically. The leaf spring strip portion, which remains in each case between the outer fastening member and the most closely adjacent inner fastening member and is preferably freely accessible, is capable of oscillating elastically and acts as a "bending beam". A through-hole in the leaf spring strip portion may be provided for adapting the elastic compliance. The main surfaces of the leaf spring portions are orientated substantially perpendicularly to the input surface and have the highest degree of compliance in the direction perpendicular to the input surface, which corresponds to the deflection direction, whereas they have, in comparison, a high degree of rigidity under compressive and tensile stress in the longitudinal direction and in the direction perpendicular to the input surface.

The input device configured in accordance with the present disclosure saves construction space and weight due to the design of the mounting means. In addition, a risk of damage to or deformation of the spring members is almost excluded. The restoring behavior is reproducibly generated even without any adjustment work. The three-point mounting provided according to the present disclosure, both due to the carrier-side fastening members towards the carrier and due to the operating-part-side fastening members towards the operating part, defines a reproducible and well-defined movement or oscillation behavior of the operating part.

Preferably, at least the operating-part-side fastening members are connected to the operating part by substance-to-substance connection, preferably welded thereto. For example, at least one fastening member and/or the associated contact surface prior to fastening to the carrier or operating part, has one or more energy directing means, such as a wedge-shaped raised portion, in order to be connected to the carrier or the operating part by substance-to-substance connection by ultrasonic welding. In addition, means for fastening the fastening member to the carrier or operating part in a clamping manner may be provided.

Preferably, at least the carrier-side fastening members are configured for producing a latching connection with the carrier in order to simplify assembly.

Preferably, the carrier-side fastening members are each provided with an installation aid, wherein the installation aid more preferably in each case projects over the carrier on the side thereof facing away from the operating part, for instance at least at the start of the assembly process. For example, the installation aid is configured as a projecting gripping aid for manual or machine installation. For example, the respective fastening member forms a rod extending orthogonally away from the leaf spring strip as an installation aid. For example, the installation aid is provided for keeping the fastening member in contact with the carrier and/or for latching the fastening member to the carrier. Preferably, the installation aid and the remaining rest of the fastening member are formed integrally.

According to a preferred embodiment, one predetermined breaking point for separating the installation aid from a rest of the carrier-side fastening member remaining on the input device is provided in each case. For example, the predetermined breaking point is provided at the transition between the rod-shaped installation aid and the remaining rest of the fastening member and configured as a reduction of the material thickness, particularly as a tapered portion.

Preferably, the carrier-side fastening members are arranged in a first plane, and the operating-part-side fastening members in a second plane parallel to the first plane, or all of them are arranged in a common plane.

Preferably, the fastening members are fixed to the leaf spring strip by injection-overmolding the leaf spring strip.

Furthermore, the present disclosure relates to a spring member suitable, in particular, for an input device in one of the embodiments described above. It has one leaf spring strip consisting of spring steel and two outer fastening members and at least one inner fastening member, which are distributed along the course of the leaf spring strip and in which the leaf spring strip is positively accommodated, wherein the outer fastening members are arranged so as to be equally spaced from a most closely adjacent inner fastening member, so that leaf spring strip portions of substantially the same length, which are capable of oscillating in a common plane, remain between the respective outer and the most closely adjacent, inner fastening members of the spring member. Preferably, at least one fastening member is configured for producing a non-positive and/or positive connection with the carrier of the input device. According to a preferred embodiment, at least one fastening member has an energy directing means, such as a wedge-shaped raised portion, in order to be connected to the operating part by substance-to-substance connection by ultrasonic welding.

Preferably, at least one fastening member forms an installation aid, wherein the installation aid more preferably extends substantially orthogonally to the course of the leaf spring strip predetermined by the arrangement of the fastening members of the leaf spring strip.

According to a preferred embodiment, one predetermined breaking point for separating the installation aid from a rest of the associated fastening member remaining on the input device is provided. For example, the predetermined breaking point is provided at the transition between the rod-shaped installation aid and the remaining rest of the fastening member.

The present disclosure further relates to a method for manufacturing an input device with the following steps. In a step of providing, an operating part having an input surface is provided. In another step of providing, a carrier is provided. Moreover, it is provided that means are provided for mounting the operating part on the carrier in a restoring manner, wherein the means are configured for mounting the operating part so that it can be deflected from a rest position in a deflection direction substantially parallel to the input surface and so as to elastically restore it to the rest position. The means for mounting the operating part in a restoring manner comprise two spring members, which respectively comprise one leaf spring strip consisting of spring steel and two outer fastening members and at least one inner fastening member, in which the leaf spring strip is positively accommodated and which are distributed along the leaf spring strip, wherein the outer fastening members are arranged so as to be uniformly spaced from a most closely adjacent inner fastening member. For example, the spring members are produced, in a preceding thermal molding method step, by injection-overmolding with a thermoplastic material. Preferably, at least one fastening member is entirely or at least partially made from a thermoplastic elastomer.

In a fastening step, an actuator for the excitation of movement of the operating part in the deflection direction is fastened on the carrier and/or the operating part in order to generate a haptic feedback for an operator by means of the actuator. Preferably, the actuator is fastened exclusively on the operating part.

In another fastening step, which may precede or follow the fastening of the actuator in time, the outer fastening members of a first spring member of the two spring members and a middle fastening member of a remaining second spring member of the two spring members are respectively fastened to the operating part, wherein they form the operating-part-side fastening members.

In yet another fastening step, which may take place before, in between or after the above-mentioned fastening steps, the outer fastening members of the second spring member and an inner fastening member of the first spring member are respectively fastened to the carrier, wherein they form the operating-part-side fastening members, so that leaf spring strip portions of substantially the same length, which are capable of oscillating in a common plane substantially parallel to the input surface, remain between the outer fastening members and the most closely adjacent, inner fastening members of the same spring member.

Preferably, the operating-part-side fastening members are fixed on the operating part by ultrasonic welding. According to a preferred embodiment, at least one provided fastening member and/or the associated contact surface on the provided carrier or the provided operating part has an energy directing means, such as a wedge-shaped raised portion, in order to be connected to the operating part by substance-to-substance connection by ultrasonic welding.

Preferably, the carrier-side fastening members are fixed on the carrier by producing a non-positive and/or positive connection, wherein this fastening step is subsequent to the fastening of the operating-part-side fastening members. For instance, the fastening member is brought into contact with the carrier and fastened in a positive and/or non-positive only when a holding device is adjusted, in order to avoid damage due to overstressing the spring member.

Preferably, the carrier-side fastening members each have an installation aid, wherein the carrier-side fastening members are fastened by means of or using the respectively provided installation aid, wherein the installation aid more preferably in each case projects over the carrier on the side thereof facing away from the operating part.

Preferably, the installation aids, after fastening the carrier-side fastening members, are separated at a predetermined breaking point from the rest of the carrier-side fastening member remaining on the input device.

The various disclosed embodiments as well as the technical environment will be explained in more detail below with reference to the Figures. It must be remarked that the Figures depict a particularly preferred embodiment of the disclosed embodiments, but that the latter is not limited thereto. The Figures schematically show:

FIG. 1: shows a schematic sectional view through an embodiment of the input device 1 according to an embodiment;

Figure 1:
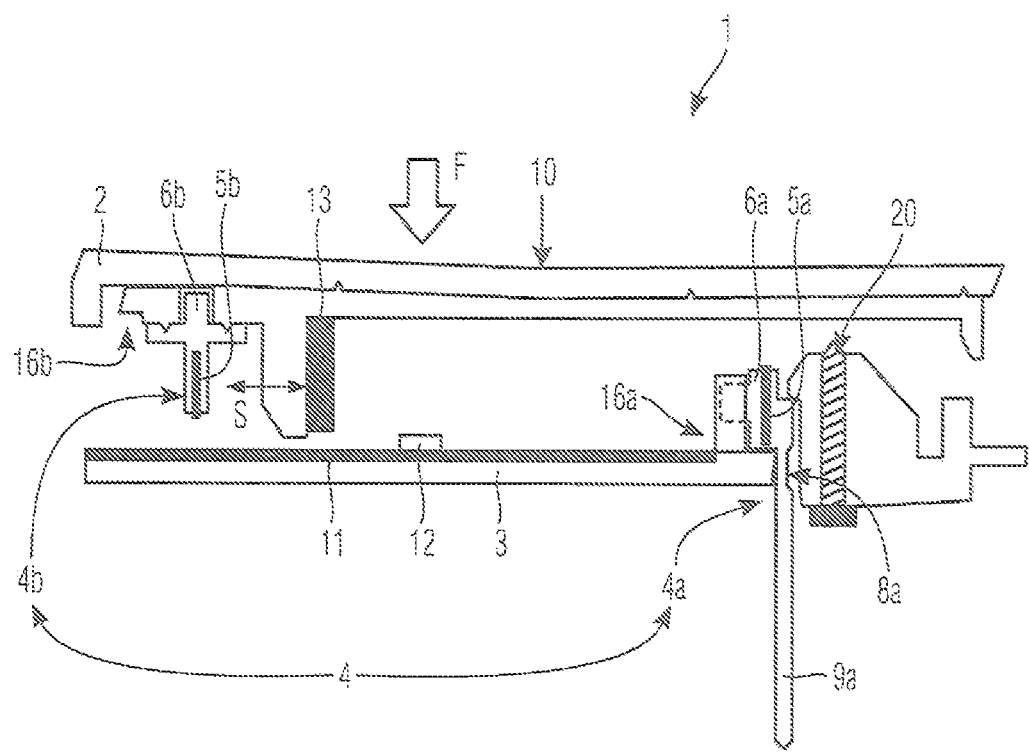

FIG. 1 shows an embodiment of the input device 1 according to an embodiment. The input device according to an embodiment includes an operating part 2, e.g. a touchpad or touchscreen. The operating part 2 has an input surface 10, in particular a touch-sensitive input surface.

The input device 1 according to an embodiment further includes a carrier 3 on which the operating part 2 is movably mounted. The input device 1 according to an embodiment further includes means 4 for mounting the operating part 2 on the carrier 3 in a restoring manner, which are configured for mounting the operating part 2 so that it can be deflected from a rest position in a deflection direction S substantially parallel to the input surface and so as to elastically restore it to the rest position. In other words, a movement of the operating part 2 from, or preferably about, the rest position is made possible.

An actuator 13 for the excitation of movement of the operating part 2 in the deflection direction S, and thus for generating a haptic feedback in said deflection direction S, is also provided. Preferably, this is an electrically actuated actuator 13, such as a voice coil actuator, which is fastened exclusively to the actuating part.

According to one embodiment, a force sensor 12, e.g. an optical force sensor, is provided for detecting an actuating force F acting on the input surface 10. For example, a haptic feedback generated by the actuator 13 is triggered upon a predetermined actuating force F being exceeded. Here, the force sensor 12 is arranged between the carrier and a housing on which the carrier is mounted in an elastically yielding or movable manner.

Here, the means 4 for mounting the operating part in a restoring manner comprise two spring members 4*a*, 4*b*, which extend substantially parallel to one another and substantially parallel to the input surface 10 and respectively have at least one leaf spring strip 5*a*, 5*b* consisting of spring steel and three fastening members 6*a*, 7*a*; 6*b*, 7*b*, in which the leaf spring strip 5*a*, 5*b* is positively accommodated. Here, the fastening members 6*a*, 7*a*; 6*b*, 7*b* formed from a thermoplastic material are fixed to the leaf spring strip 5*a*, 5*b* by injection-overmolding the leaf spring strip 5*a*, 5*b* in a thermal molding method.

In this case, the fastening members 6*a*, 7*a*; 6*b*, 7*b* of a spring member 4*a*, 4*b* are arranged equally spaced apart from one another and distributed along the leaf spring strip 5*a*, 5*b*, so that several leaf spring strip portions of substantially the same length, which are capable of oscillating in a plane substantially parallel to the input surface, remain between the fastening members 6*a*, 7*a*; 6*b*, 7*b* of the same spring member 4*a*, 4*b*. In the illustrated embodiment, the leaf spring strip 5*b* is arranged in each case on edge between the operating part 2 and the carrier 3, i.e. the main surface of the leaf spring strips 5*a*, 5*b* is arranged substantially orthogonally to the input surface 10.

Figure 2:
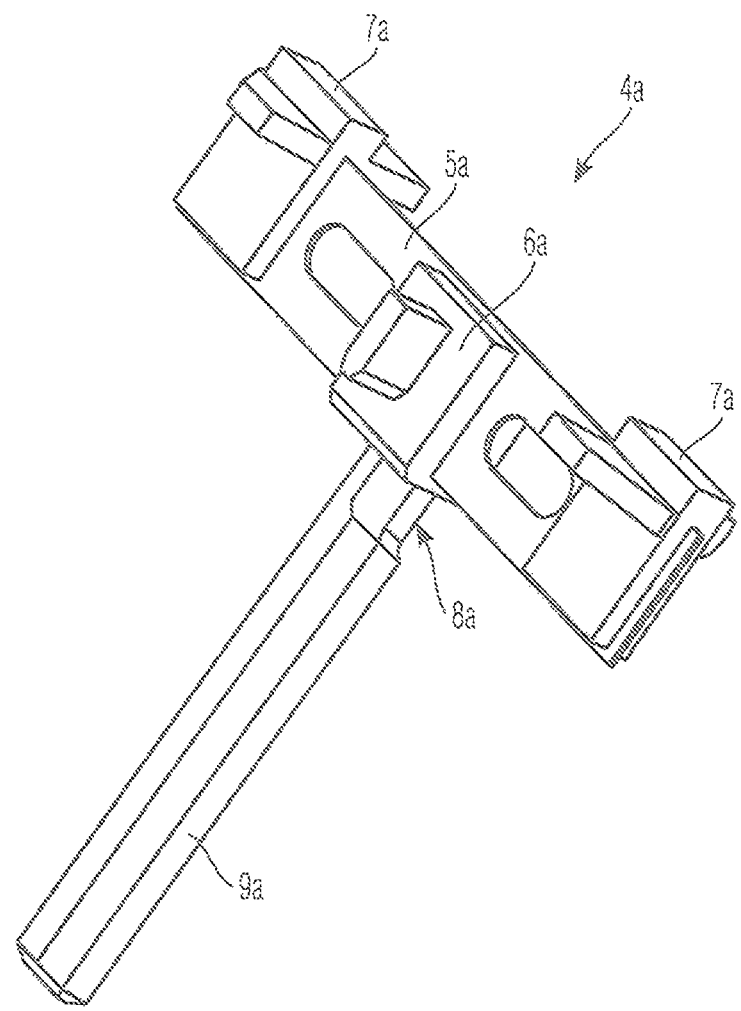
FIG. 2 shows a perspective view of a first spring member 4*a* associated with the input device 1.
Figure 3:
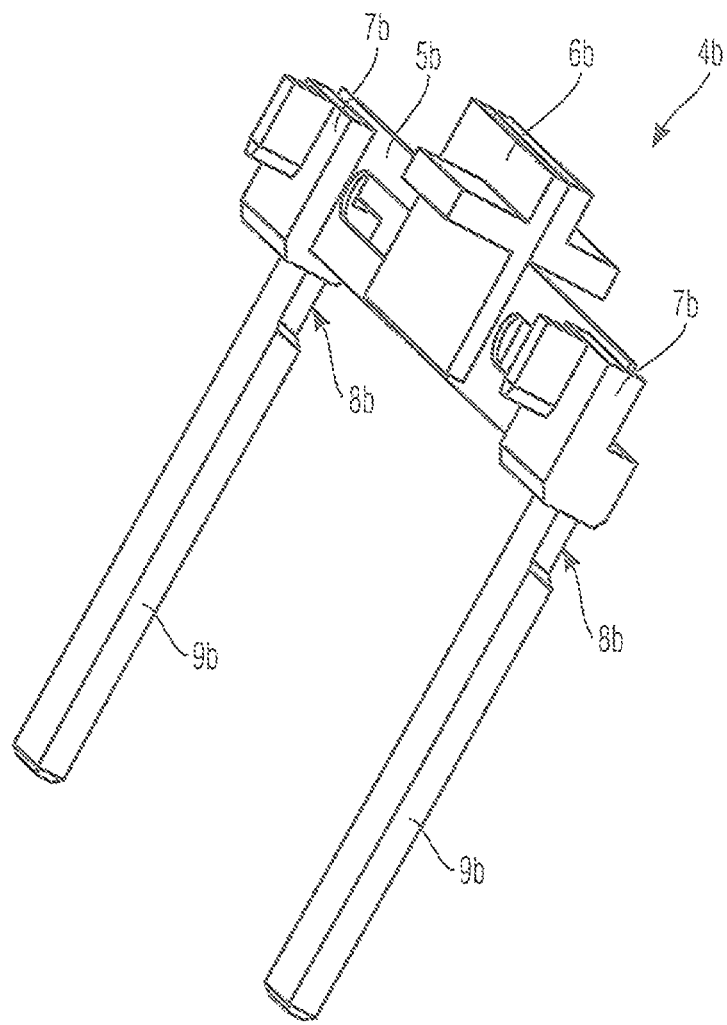
FIG. 3 shows a perspective view of a second spring member 4*a* associated with the input device 1.
Figure 5:
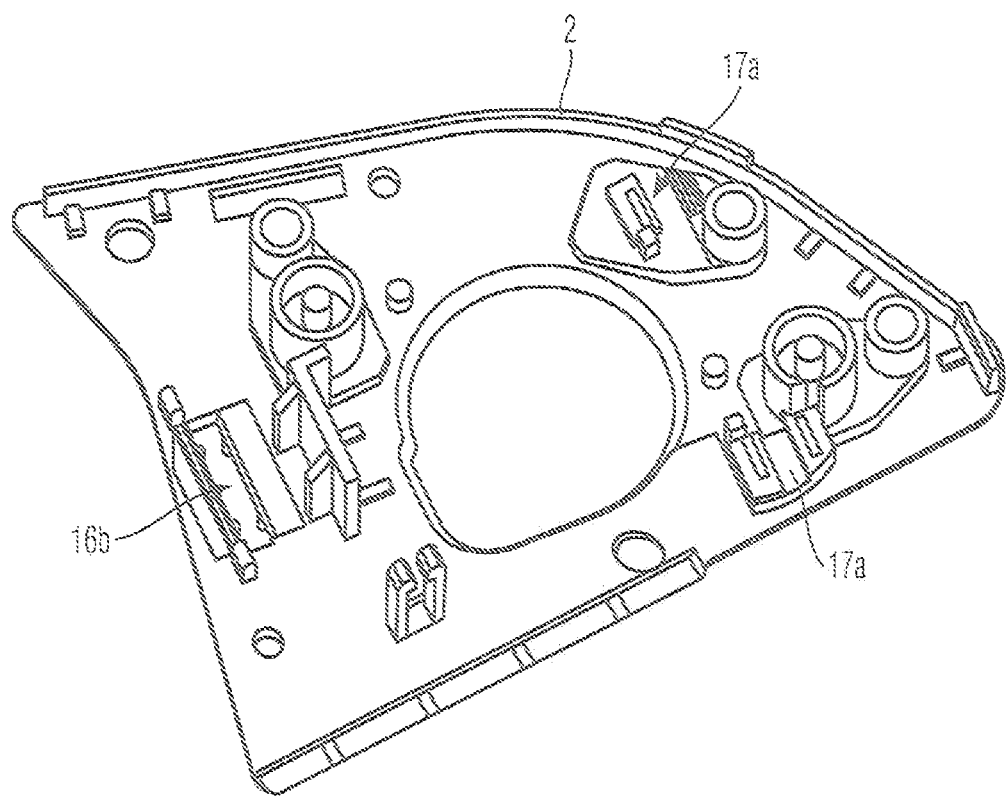
FIG. 5 shows a perspective rear view of the operating part 2 from FIG. 1.

As is shown in the FIGS. 2 and 3, the outer fastening members 7*a* of a first spring member 4*a*, which is shown in FIG. 2, and an inner fastening member 6*b* of a remaining second spring member 4b, which is shown in FIG. 3, in this case form the operating-part-side fastening members 7a, 6b, which is to express that they are each fixed to the operating part 2. Moreover, the outer fastening members 7b of the second spring member 4b and an inner fastening member 6a of the first spring member 4a form the carrier-side fastening members 7b, 6a, and are thus each fixed on the carrier 3. The operating-part-side fastening members 7a, 6b are each fixed on the operating part 2, specifically in the area of the accommodating portions 17a and 16b from FIG. 5, by substance-to-substance connection, in this case by ultrasonic welding. For this purpose, the associated contact surface of the operating part 2 has in each case at least one energy directing means, such as a wedge-shaped raised portion, in order to be connected to the operating part 2 by substance-to-substance connection by ultrasonic welding. In addition, means for fastening the operating-part-side fastening member 7a, 6b to the operating part 2 in a clamping manner may be provided. In the illustrated embodiment, the carrier-side fastening members 7b, 6a and the operating-part-side fastening members 6a, 7b are arranged in a common plane that is substantially parallel to the input surface 10.

Figure 4:
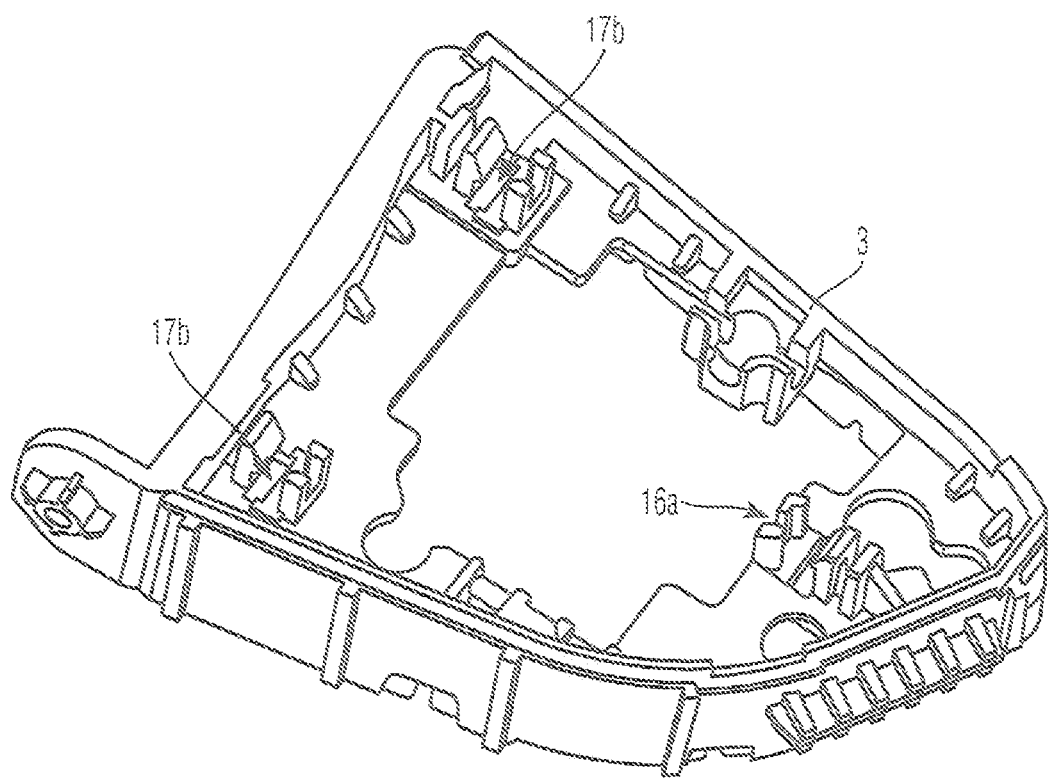
FIG. 4 shows a perspective rear view of the carrier 2 from FIG. 1.

While the carrier-side fastening members 7b, 6a are fixed, by being positively and/or non-positively accommodated on the carrier 3, in the associated accommodating portions 16a and 17b, with the latter being visible in FIG. 4. The positive or non-positive accommodation is obtained by adjusting a holding device 20, which in this case is realized by a screw guided in a conical threaded bore, wherein screwing the screw into the threaded bore causes the positive and/or non-positive connection between the carrier 3 and the carrier-side fastening member 6a, as is shown in FIG. 1.

For example, the leaf spring strips 5a, 5b are each manufactured in a punching step and preferably configured identically. The leaf spring strip portion, which remains between the inner fastening member 6a, 6b and outer fastening members 7a, 7b and is preferably freely accessible, is capable of oscillating elastically and acts as a "bending beam". As illustrated, a through-hole in the leaf spring strip portion may be provided for adapting the elastic compliance. Their main surfaces are orientated substantially perpendicularly to the input surface 10 and have the highest degree of compliance in the direction perpendicular to the input surface 10, which corresponds to the deflection direction S, whereas they have, in comparison, a high degree of rigidity under compressive and tensile stress in the longitudinal direction and in the direction perpendicular to the input surface 10.

The input device 1 configured in accordance with the disclosed embodiments saves construction space and weight due to the specific design of the mounting means 4. In addition, a risk of damage to or deformation of the associated spring members 4a, 4b is almost excluded. The restoring behavior is reproducibly generated even without any adjustment work. The three-point mounting provided according to an embodiment, both due to the carrier-side fastening members 7b, 6a towards the carrier 3 and due to the operating-part-side fastening members 7a, 6b towards the operating part 2, defines a reproducible and well-defined movement or oscillation behavior of the operating part 2.

To facilitate assembly, the carrier-side fastening members 7b, 6a are each provided with an installation aid 9a, 9b, wherein the installation aid 9a, 9b in each case projects over the carrier 3 on the side thereof facing away from the operating part 2, and is configured in each case as a projecting gripping aid for manual or machine installation. Specifically, the respective fastening member forms a rod extending orthogonally away from the leaf spring strip 5a, 6b as an installation aid. Here, the installation aid 9a, 9b is provided for latching the carrier-side fastening member 7b, 6a to the carrier 3. Here, the installation aid 9a, 9b and the remaining rest of the carrier-side fastening member 7b, 6a are formed integrally.

A predetermined breaking point 8a, 8b for separating the installation aid 9a, 9b from a rest of the carrier-side fastening member 7b, 6a remaining on the input device 1 is provided in each case. Specifically, the predetermined breaking point 8a, 8b is provided at the transition between the rod-shaped installation aid 9a, 9b and the remaining rest of the carrier-side fastening member 7b, 6a and configured as a reduction of the material thickness, particularly as a tapered portion. Therefore, there is the possibility of separating the installation aids 9a, 9b, after fastening the carrier-side fastening members 7b, 6a, at the predetermined breaking point 8a, 8b from the rest of the carrier-side fastening member 7b, 6a remaining on the input device 1.

The invention claimed is:

1. An input device, comprising:
   an operating part with an input surface;
   a carrier;
   mounts, wherein the mounts are adapted to mount the operating part on the carrier in a restoring manner, which are configured for mounting the operating part so that it deflects from a rest position in a deflection direction substantially parallel to the input surface and so as to elastically restore it to the rest position; and
   an actuator for the excitation of movement of the operating part in the deflection direction in order to generate a haptic feedback for an operator;
   wherein the mounts comprise two spring members, which extend substantially parallel to one another and substantially parallel to the input surface, and which respectively have one leaf spring strip having a spring steel and at least three fastening members distributed along the associated leaf spring strip, in which the leaf spring strip is positively accommodated, so that leaf spring strip portions of substantially the same length, which are capable of oscillating in a plane substantially parallel to the input surface, in each case remain between outer fastening members of the at least three fastening members and a most closely adjacent, inner fastening members of the at least three fastening members of the same spring member;
   wherein the outer fastening members of a first spring member of the two spring members and an inner fastening member of a remaining second spring member of the two spring members form operating-part-side fastening members and are each fixed on the operating part, and the outer fastening members of the second spring member and an inner fastening member of the first spring member form carrier-side fastening members and are each fixed on the carrier.

2. The input device according to claim 1, wherein at least the operating-part-side fastening members are connected to the operating part by a substance-to-substance connection.

3. The input device according to claim 2, wherein the substance-to-substance connection is formed by welding.

4. The input device according to claim 1, wherein at least the carrier-side fastening members are configured to produce a latching connection with the carrier.

5. The input device according to claim 1, wherein the carrier-side fastening members each have an installation aid, wherein the installation aid in each case projects over the carrier on a side thereof facing away from the operating part.

6. The input device according to claim 5, wherein one predetermined breaking point is provided in the each case, wherein the one predetermined breaking point is adapted to separate the installation aid from a rest of the carrier-side fastening member remaining on the input device.

7. The input device according to claim 1, wherein the carrier-side fastening members are arranged in a first plane, and the operating-part-side fastening members are arranged in a second plane parallel to the first plane, or the carrier-side fastening members and the operating-part-side fastening members are arranged in a common plane.

8. The input device according to claim 1, wherein the at least three fastening members are each fixed to the leaf spring strip by injection-overmolding the leaf spring strip.

9. The input device according to claim 1, wherein all fastening members are formed from a thermoplastic material.

10. The input device according to claim 9, wherein at least one of the all fastening members is at least partially formed from a thermoplastic elastomer.

11. A method for producing an input device comprising the following steps:
providing an operating part having an input surface;
providing a carrier;
providing mounts that are adapted to mount the operating part on the carrier in a restoring manner, which are configured for mounting the operating part so that it deflect from a rest position in a deflection direction substantially parallel to the input surface and so as to elastically restore it to the rest position;
wherein the mounts for mounting the operating part in a restoring manner comprise two spring members, which respectively have one leaf spring strip having a spring steel and at least three fastening members distributed along the associated leaf spring strip, in which the leaf spring strip is positively accommodated;
fastening an actuator for the excitation of movement of the operating part in the deflection direction on the carrier and/or the operating part in order to generate a haptic feedback for an operator;
respectively fastening to the operating part outer fastening members of a first spring member of the two spring members and an inner fastening member of a remaining second spring member of the two spring members, wherein they form operating-part-side fastening members;
respectively fastening to the carrier outer fastening members of the second spring member and an inner fastening member of the first spring member, wherein they form carrier-side fastening members, so that leaf spring strip portions of substantially the same length, which are capable of oscillating in a common plane substantially parallel to the input surface, remain between the outer fastening members and a most closely adjacent, inner fastening members of the same spring member, and the two spring members extend substantially parallel to one another and substantially parallel to the input surface.

12. The method according to claim 11, wherein the operating-part-side fastening members are fixed on the operating part by an ultrasonic welding.

13. The method according to claim 11, wherein the carrier-side fastening members are fixed on the carrier by latching.

14. The method according to claim 11, wherein the carrier-side fastening members each have an installation aid, and the carrier-side fastening members are fastened by the respectively provided installation aid, wherein the installation aid in each case projects over the carrier on the side thereof facing away from the operating part.

15. The method according to claim 14, wherein the installation aids, after fastening the carrier-side fastening members, are separated at a predetermined breaking point from a rest of the carrier-side fastening member remaining on the input device.

16. The method according to claim 11, wherein all fastening members of the at least three fastening members are being formed from a thermoplastic material.

17. The method according to claim 16, wherein at least one of the all fastening members is at least partially being formed from a thermoplastic elastomer.

* * * * *